United States Patent [19]

Koumo et al.

[11] Patent Number: 5,249,147
[45] Date of Patent: Sep. 28, 1993

[54] ELECTRONIC APPARATUS PROVIDED WITH DEVICE OF CALCULATING COMPLEX NUMBERS

[75] Inventors: Hideyasu Koumo, Yamatokoriyama; Fumiaki Kawawaki, Shiki, both of Japan

[73] Assignee: Sharp Kabushiki Kaisha, Osaka, Japan

[21] Appl. No.: 8,704

[22] Filed: Jan. 25, 1993

[30] Foreign Application Priority Data

Jan. 29, 1992 [JP] Japan .................................. 4-14278

[51] Int. Cl.$^5$ ............................................. G06F 7/38
[52] U.S. Cl. .................... 364/736; 364/709.12
[58] Field of Search ................. 364/709.12, 736

[56] References Cited

U.S. PATENT DOCUMENTS 4,511,987  4/1985  Caldwell et al. .............. 364/736 X
4,852,057  7/1989  Patton .......................... 364/709.06
4,885,714  12/1989  Eisenstein et al. ............ 364/709.01

FOREIGN PATENT DOCUMENTS 53-83547  7/1978  Japan .
61-75459  4/1986  Japan .
61-75460  4/1986  Japan .

Primary Examiner—Tan V. Mai
Attorney, Agent, or Firm—Nixon & Vanderhye

[57] ABSTRACT

An electronic apparatus provided with a device of calculating complex numbers includes a keyboard for entering calculation data including a value and an imaginary number unit i, an LCD device for displaying a result of performed calculation of the complex numbers consisting of a real number and an imaginary number unit i, and a processing unit. The processing unit has a judging part for judging whether or not a value is entered immediately before or after the imaginary number unit i, first calculating part for calculating the complex numbers in accordance with a predetermined priority in calculation by substituting 1i with the imaginary number unit i while inserting a multiplication code between the entered value and the imaginary number unit i upon detecting the entered value is positioned before the entered imaginary number unit i, and second calculating part for calculating a portion having the imaginary number unit i as a function followed by an argument upon detecting calculation data that a value is entered immediately after the imaginary number unit i.

4 Claims, 9 Drawing Sheets

FIG. 3

| KEY OPERATION | DISPLAY | | COMMENT |
| --- | --- | --- | --- |
| | DOT PORTION | FIGURE PORTION | |
| 2 | | 2. | ENTERING A VALUE 2 |
| (i) | i | — | ENTERING i |
| + | + | — | ENTERING + |
| (i) | i | — | ENTERING i |
| 4 | i | 4. | ENTERING A VALUE 4 |
| = | | 6.i | DISPLAY THE RESULT OF CALCULATION |

| FBC | | FB |
|---|---|---|
| 1 | 1 | x |
| | 2 | |
| | 3 | |
| | 4 | |
| | 5 | |
| | ⋮ | |
| | 16 | |

FIG. 4 (b)
"sin"

| FBC | | FB |
|---|---|---|
| 2 | 1 | x |
| | 2 | sin |
| | 3 | |
| | 4 | |
| | 5 | |
| | ⋮ | |
| | 16 | |

FIG. 4 (c)
"30+"

| FBC | | FB |
|---|---|---|
| 3 | 1 | x |
| | 2 | sin |
| | 3 | + |
| | 4 | |
| | 5 | |
| | ⋮ | |
| | 16 | |

| FBC | | FB |
|---|---|---|
| 2 | 1 | x |
| | 2 | + |
| | 3 | |
| | 4 | |
| | 5 | |
| | ⋮ | |
| | 16 | |

| FBC | | FB |
|---|---|---|
| 1 | 1 | + |
| | 2 | |
| | 3 | |
| | 4 | |
| | 5 | |
| | ⋮ | |
| | 16 | |

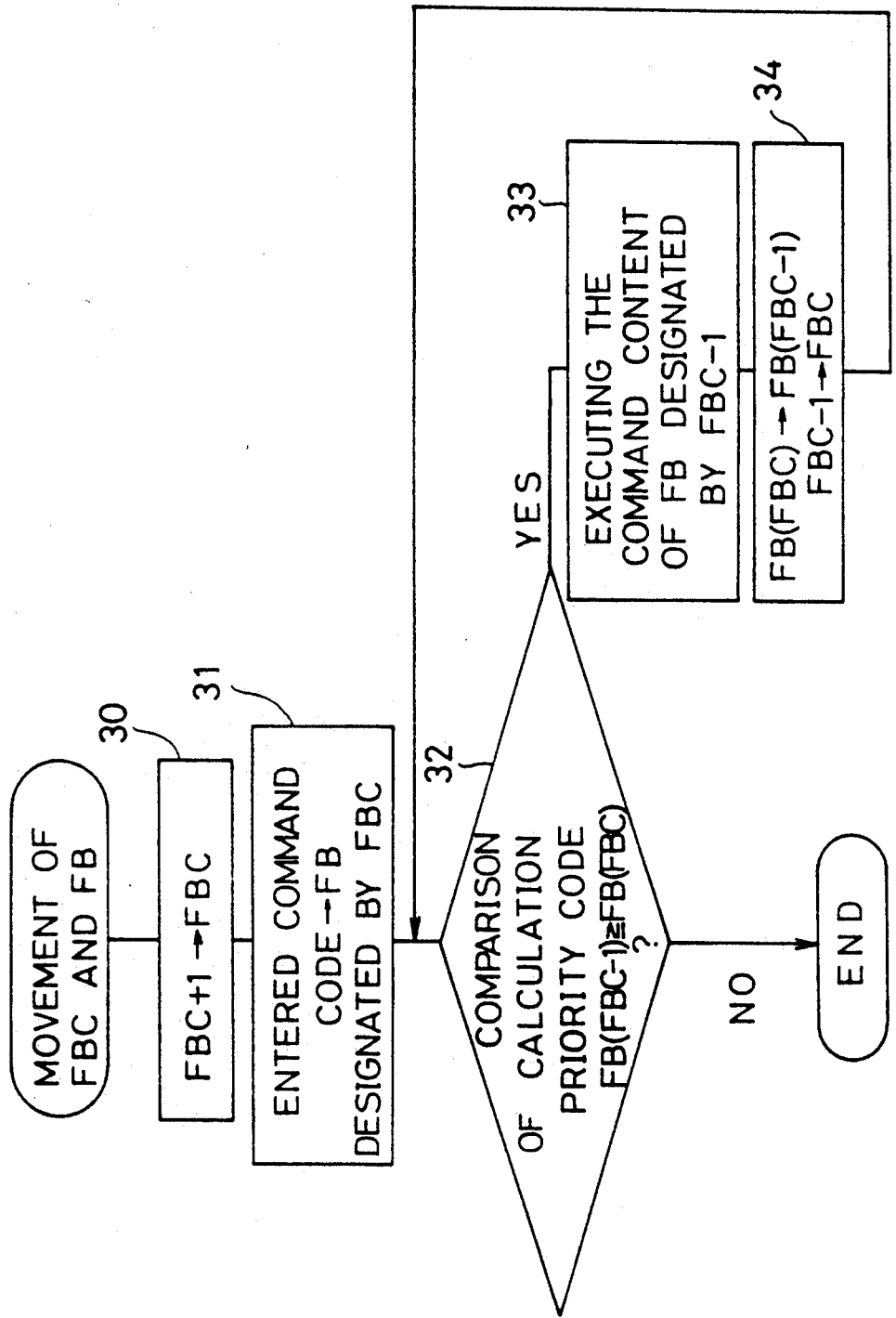

FIG. 6 (a) "2i"

| FBC | FB | |
|---|---|---|
| 2 | 1 | x |
| | 2 | i |
| | 3 | |
| | 4 | |
| | 5 | |
| | ... | |
| | 16 | |

FIG. 6 (b) "+"

| FBC | FB | |
|---|---|---|
| 3 | 1 | x |
| | 2 | i |
| | 3 | + |
| | 4 | |
| | 5 | |
| | ... | |
| | 16 | |

FIG. 6 (c) →

| FBC | FB | |
|---|---|---|
| 1 | 1 | + |
| | 2 | |
| | 3 | |
| | 4 | |
| | 5 | |
| | ... | |
| | 16 | |

FIG. 6 (d) "i"

| FBC | FB | |
|---|---|---|
| 2 | 1 | x |
| | 2 | i |
| | 3 | |
| | 4 | |
| | 5 | |
| | ... | |
| | 16 | |

FIG. 6 (e) "4="

| FBC | FB | |
|---|---|---|
| 0 | 1 | |
| | 2 | |
| | 3 | |
| | 4 | |
| | 5 | |
| | ... | |
| | 16 | |

FIG. 9 (PRIOR ART)

| KEY OPERATION | DISPLAY | COMMENT |
|---|---|---|
| 2 [i] | 2.i | ENTERING AN IMAGINARY NUMBER PORTION(2i) |
| + [i] | 1.i | ENTERING 1i WITH AN OPERATION OF ENTERING i |
| 4 | 4. | OVERWRITING A VALUE 4 ON 1i (cannot be entered as i4) |
| = | 4. | DISPLAYING A REAL NUMBER PORTION OF A COMPLEX NUMBER |
| [Re→Im] | 2.i | DISPLAYING AN IMAGINARY NUMBER PORTION OF A COMPLEX NUMBER |

ELECTRONIC APPARATUS PROVIDED WITH DEVICE OF CALCULATING COMPLEX NUMBERS

BACKGROUND OF THE INVENTION

1. Field of the Invention

The present invention relates to an electronic apparatus provided with a device of entering and calculating complex numbers, which apparatus is suitable for a function electronic calculator.

2. Description of the Related Art

FIG. 9 shows an example of the operation of entering complex numbers using a conventional electronic apparatus of this kind as well as a resulting display thereon. Referring to FIG. 9, a method for entering complex numbers enables an imaginary number unit i to be entered immediately after entering a value 2 without fail as seen in an example of 2i.

However, such conventional method for entering complex numbers does not allow entering directly mathematical expressions represented as i2. As seen in this case, the method suffers a drawback of complicating the input operation itself, because it demands operators to converting the input location of the imaginary number unit to a predetermined form so that the unit come after a real number.

Incidentally as related art of the present invention the Japanese Laid-Open Patent No. 83547/1978 discloses an electronic calculator provided with a device of calculating complex numbers, said calculator comprising a real number key designating a real number portion of the complex numbers and an imaginary number key designating an imaginary number portion thereof, said real number key functioning to transcribe the contents of substituted registers onto an auxiliary register, whereas said imaginary number key functioning to impede the transmission of the contents of the substituted register and those of the auxiliary register.

The Japanese Laid-Open Patent No. 75459/1986 also discloses another electronic calculator provided with a device of calculating complex numbers comprising:

a first register for memorizing both a real number and an imaginary number portion of the complex numbers produced by a calculation; and a second register for memorizing both imaginary number and real number portion of the complex numbers that are not memorized in the first register;

the contents of the first and the second register being exchanged in response to the operation of the changeover switch to selectively displaying either the real number or the imaginary number portion of the complex numbers determined in the above process.

The Japanese Laid-Open Patent No. 75460/1986 also discloses another electronic calculator provided with a device of calculating a complex number comprising a register housing both a real number portion and an imaginary number portion, said calculator simultaneously displaying both the real number and imaginary number portion while distinguishing them to provide an immediate detection of calculation results without errors.

SUMMARY OF THE INVENTION

The present invention provides an electronic apparatus provided with a device of calculating complex numbers so constituted as to allow entering an imaginary number unit both before and after each value on the basis of considerations of the above circumstances.

That is, the present invention provides an electronic apparatus provided with a device of calculating complex numbers comprising: input means for entering calculation data including a value and an imaginary number unit i; output means for outputting a result of performed calculation of the complex numbers consisting of a real number and an imaginary number unit i; judging means for judging whether or not a value is entered immediately before or after the imaginary number unit i; first calculating means for calculating the complex numbers in accordance with a predetermined priority in calculation by substituting 1i with the imaginary number unit i while inserting a multiplication code between the entered value and the imaginary number unit i upon detecting the entered value is positioned before the entered imaginary number unit i; and second calculating means for calculating a portion having the imaginary number unit i as a function followed by an arguement upon detecting calculation data that a value is entered immediately after the imaginary number unit i.

According to the present invention, the following three calculation operations are performed to allow entering an imaginary number unit both before and after a real number. Firstly, the calculator handles the imaginary number unit i as a function followed by an argument. Secondly, when a value is placed before an imaginary number unit i, a X code (omission X code) is placed between the value and the imaginary number unit i. Thirdly, when an imaginary number unit i is given immediately before real numbers and other symbols in handling functions, arithmetic calculations and equals, the calculation is handled as a function followed by an argument whereas a value is given immediately before the imaginary number unit i, an entered value X 1i is calculated.

BRIEF DESCRIPTION OF THE DRAWINGS

The present invention will be detailed by way of accompanying drawings in which:

FIG. 3 is a view illustrating a key operation in an embodiment of the function calculator and a display example thereof.

FIGS. 4(a)-4(e) are views illustrating a relationship between the FB and the FBC in an embodiment of the function electronic calculator according to the invention.

FIG. 5 is a flow chart illustrating a movement as shown in FIGS. 4(a)-4(e).

FIGS. 6(a)-6(e) views illustrating a relationship between the FB and the FBC corresponding to the operation in FIG. 3.

FIG. 9 is a view illustrating a key operation of a conventional electronic calculator and a display example thereof.

DESCRIPTION OF THE PREFERRED EMBODIMENTS

Figure 1:
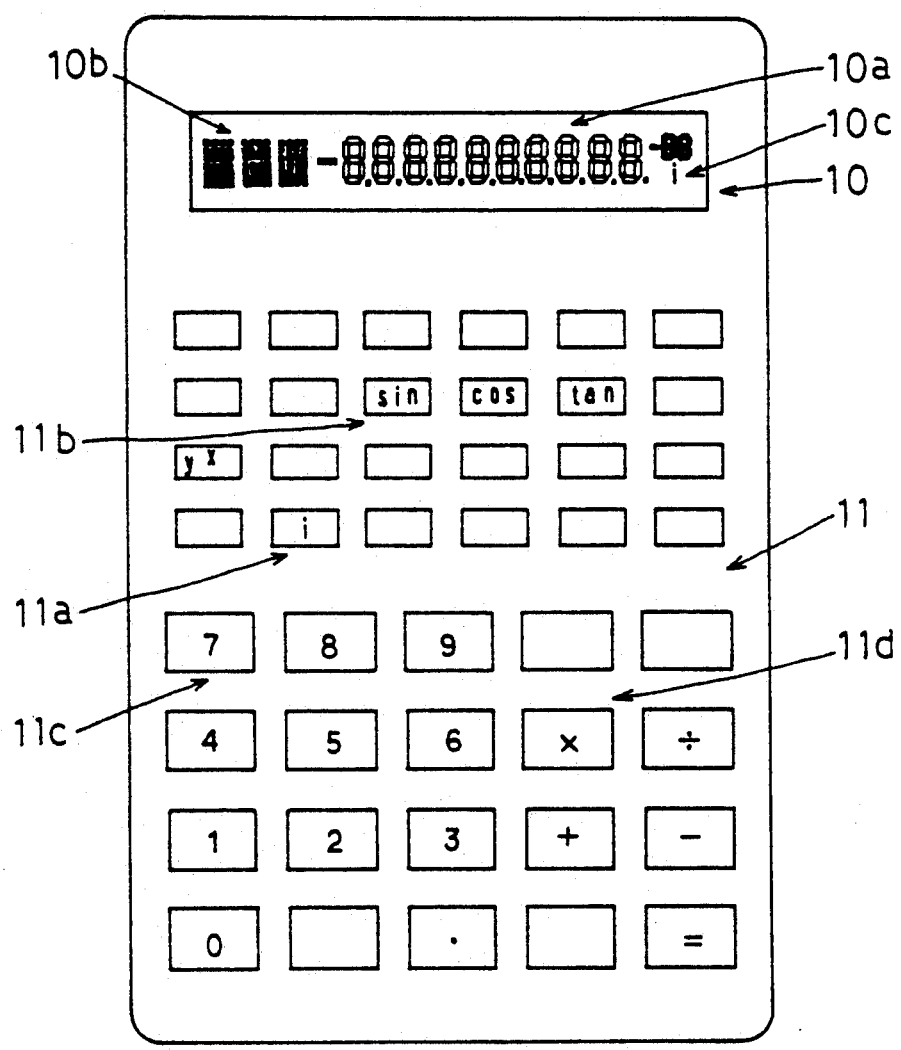
FIG. 1 is a view showing an external appearance of an embodiment of the function electronic calculator according to the invention.

The present invention will be detailed by way of an embodiment shown in the drawings. This should not be construed as limiting the invention thereto.

The invention can be applied to every kind of electronic apparatus both large and small, and it is particularly suitable for desk-top type or pocket type function electronic calculators.

The invention will be detailed with respect to the behavior of a desk top type function calculator. In the application of the invention to such calculator, the functions of the present invention is added to the calculator provided with the fundamental function of a conventional electronic calculator. The function of the present invention will be detailed hereinbelow.

The input means in the invention can be of any kind as long as it can enter calculation data including values and an imaginary number unit i. The means can be incorporated in ten keys provided on a key board. It can be incorporated in calculation keys and function keys. It can consist of a key board provided independently of the above key board.

The output means in this invention can be of any kind as long as it can output the result of calculation of complex numbers consisting of a real number and an imaginary number. It can be of a display unit like a LCD provided as a fundamental unit in a desk-top type electronic calculator. It can be incorporated in a printing unit of thermal type dot printer. It can consist of a printer provided independently of this display unit.

The judging means and the first and the second calculating means can comprise a microcomputer preferably including CPU, ROM, RAM and I/O port.

FIG. 1 is a plan view showing an external appearance of a function electronic calculator according to the invention.

Referring to FIG. 1, reference numeral 10 designates a display portion of a calculator as an output means. Reference numeral 10a in the display portion designates a LCD display part constituted by a segment method for displaying values, 11b a LCD display constituted by a dot matrix method for displaying an operation guidance, and 10c a symbol i for displaying a complex number i.

Reference numeral 11 designates a key input portion as an input means. Reference numeral 11a in the key input portion 11 designates an i key for entering an imaginary number portion of the complex number, 11b representative of $y^x$, sin, cos, tan and the like designates a key for performing function calculations, 11c representative of an integer of 0 to 9 designates a key for substituting a value, 11d representative of arithmetic calculation keys $+ - \times \div$ designates a key for performing arithmetic calculations such as addition, subtraction, multiplication and division.

Figure 2:
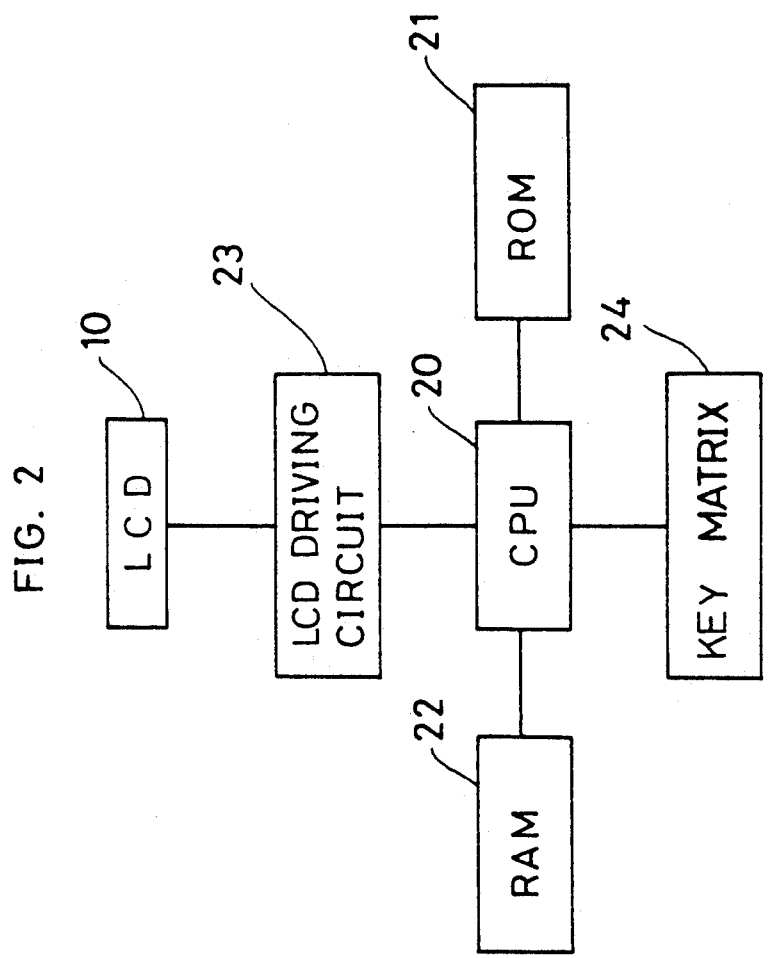
FIG. 2 is a block diagram illustrating a construction of an embodiment of the function electronic calculator according to the invention.

FIG. 2 is a block diagram illustrating a construction of a calculator according to the present invention shown in FIG. 1. Referring to FIG. 2, reference numeral 20 designates a CPU controlling the embodiment of the calculator according to the invention. The CPU functions as a judging means, a first calculation means and a second calculation means. Reference numeral 21 designates a ROM housing programs for running the calculator and constants and 22 a RAM for controlling the calculator and memorizing values.

Reference numeral 23 designates a LCD driving circuit controlling a LCD 10 which displays each kind of the above information and 24 a key matrix for detecting a key input.

Referring to FIG. 3, an example of a key operation associated with the function of the above calculator and a display example thereof are detailed. The example shown here illustrates a case of calculating an equation 2i+i4 by the operation unit of each key. The key operation designated by symbol a in FIG. 3 entered [i] key after entering values. Contrary to this operation, the key operation designated by symbol b in FIG. 3 entered [i] key after entering values. It is apparent that the above procedure enabled an input in the form in which input operation was conventionally impossible to perform. Besides, the key operation designated by symbol c in FIG. 3 displayed a result of addition of complex numbers entered in different forms.

FIGS. 4(a)-4(e) show an operation of a function buffer (hereinafter abbreviated as FB) and an operation of a function buffer counter hereinafter referred to as FBC). The FB is constituted of registers for memorizing commands functions). This embodiment of the calculator was able to memorize commands up to the 16 steps. FBC served as a counter for specifying an address for FB. Incidentally, FIG. 5 is a flow chart illustrating movements of the FB and the FBC and a symbol FB (FBC) shown in FIG. 5 designates the content of FB represented with the FBC.

Referring to FIG. 5, upon entering a command (function), the calculation process proceeds to the step 30 to add a value 1 to the value of the FBC to specify the buffer next to the currently specified FB. In the next process, the calculation process proceeds to step 31 where the entered command code is memorized to the location of the FB specified by the FBC. In the subsequent process, the calculation process proceeds to step 32 where the priority order of an entered command code FB (FBC) and a command code FB (FBC-1) entered further prior to the command code FB (FBC) is determined whether or not it could be defined as FB (FBC−1)≧FB (FBC). The process will be completed at that stage with an indication of "no" or a determination that the FB (FBC−1) had a lower calculation priority than the FB (FBC).

On the other hand, the process proceeds to step 33 with a determination that the FB (FBC−1) had a higher calculation priority than the FB (FBC), thereby executing a command memorized in the FB (FBC−1). The process further proceeds to step 34 where the content of the FB (FBC) is transferred to the position of the FB (FB−1) to subtract a value 1 from the value of the FBC so as to specify the position of the FBC. Subsequently, the process returns to step 32 to repeat the same process described above.

FIGS. 4(a)-4(e) designate a movement of the FB and the FBC in calculating an equation 3 X sin 30+····. The calculation priority order can be described as i >sin> X > + > =. FIG. 4(a) designates a state of entered "3 X", indicating that a value 1 is added to the value of the FBC and a symbol "X" is memorized in the FB at a position specified by the FBC. This movement corresponds to steps 30 to 32 shown in FIG. 5.

4(b) designates a state of the continuous input of "sin". FIGS. 4(c)-4(e)designate a state of further continuous input of "30+". FIG. 4(e) designates the same treatment conducted as shown in FIG. 4(a). This movement corresponds to steps 30 to 31 shown in FIG. 5.

In the subsequent process, the calculation priority order is compared between the memorized "+" code and the "sin" code memorized prior to the "+" code by one step. The result shows that the "sin" code had a higher calculation priority than the "+" code as shown in FIG. 4(c), which enables the execution of sin functions, follows by the deletion of memorized "sin". Such movement corresponds to steps 32 through 34 in FIG. 5.

FIG. 4(d) designates that the handling and judgment similar to the counterpart shown in FIG. 4(c) is performed to give a result shown in FIG. 4(e).

Incidentally, FIGS. 6(a)-6(e) designate the movement of FB and FBC through a key operation of (2i+i4) shown in FIG. 3. FIG. 6(a) shows a state of entered "2i", It shows that "x" and "i" are memorized in the FB, indicating that values of the FB had increased by two.

FIG. 6(b) designates the state immediately after entering a symbol "+". In this process, the calculation is executed in the order of "i" to "x", because "i" and "x" has a higher priority than the symbol "+". Finally the symbol "+" remains as shown in FIG. 6(c).

FIG. 6(d) designates that a value 1 is added to the value of the FB whereas the FB memorizes "i". FIG. 6(e) designates that value 4 is entered and all the functions memorized in the FB is executed to permit the value of the FB to return to the initial value 0. Here the operation of calculating a function followed by an argument i provides entering the argument in the imaginary number portion while executing the process of converting the real number portion to a value 0.

Figure 7:
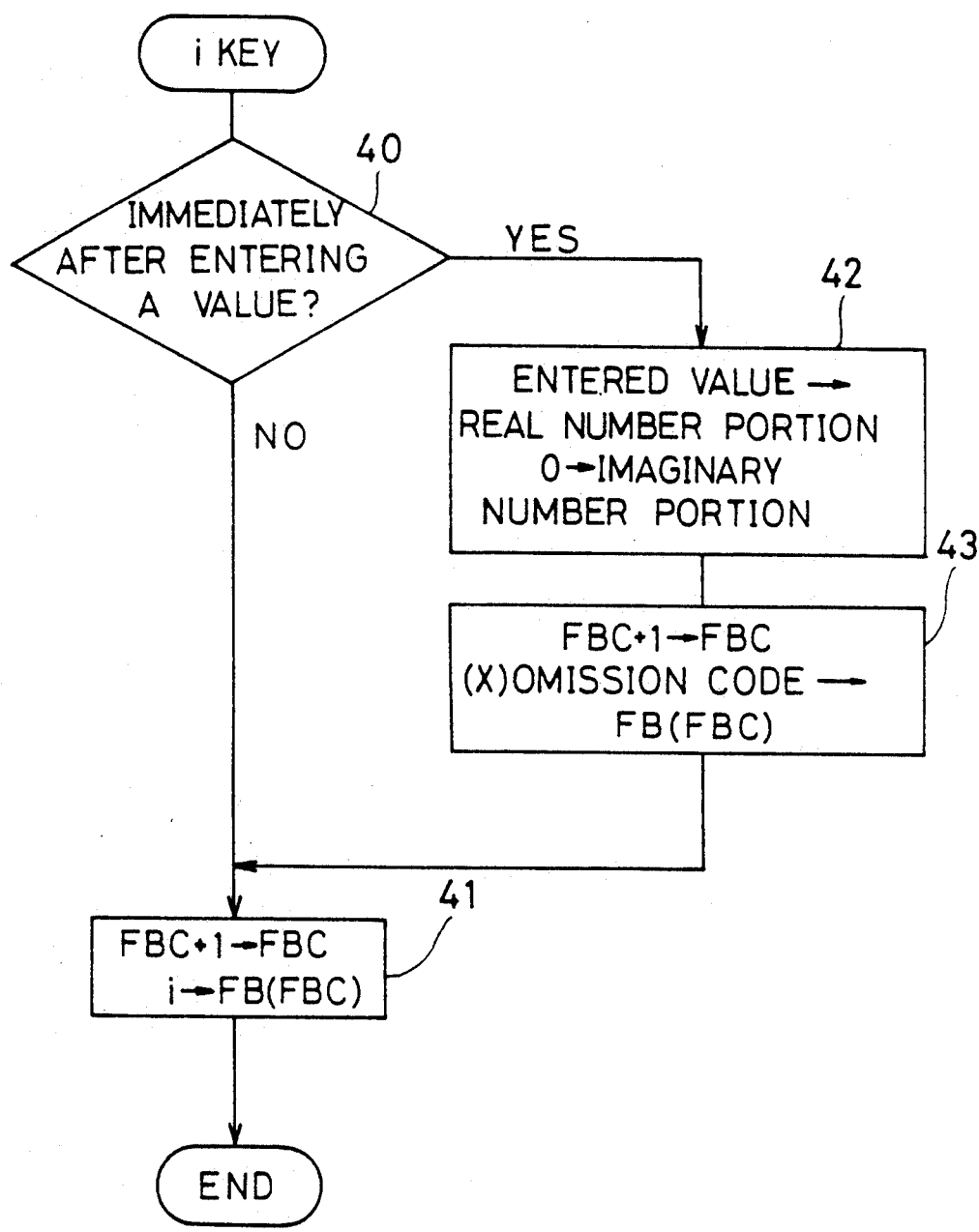
FIG. 7 is a flow chart illustrating the function of an i key in an embodiment of the function electronic calculator according to the invention.

FIG. 7 shows a schematic flow chart of [i] key with respect to the function. Referring to FIG. 7, the process proceeds to step 40 to judge whether or not the current state is immediately after entering a value. When the state is judged that it is not immediately after entering a value, the process proceeds to step 41 to complete the process by adding a value 1 to the value of the FB and memorizing the code of the imaginary number i portion in the FB.

On the other hand, the judgment shows that it is immediately after entering a value as a result of step 40, the entered value is memorized in the real number portion of the calculation register while memorizing a figure 0 in the imaginary number portion. (step 42)

Subsequently, the process proceeds to step 43 to add a value 1 to the value of the FB and to allow a X omission code (indicating the omission of multiplication) to be memorized in the FB specified by the FBC. In detail, the X omission code is entered automatically by programs. The process proceeds to step 41 to execute the same operation mentioned above.

Figure 8:
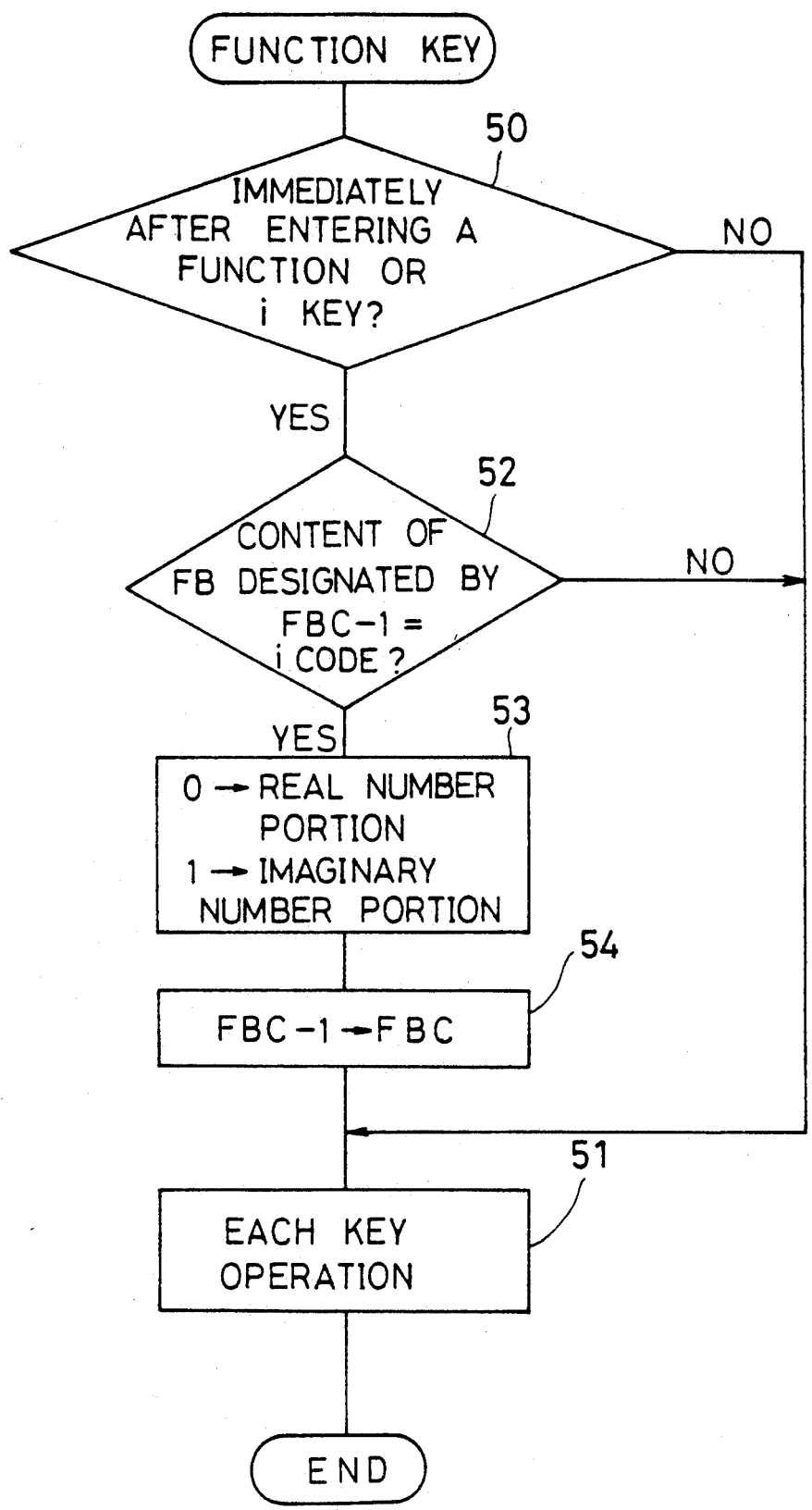
FIG. 8 is a flow chart illustrating the function of an embodiment of the function electronic calculator according to the invention.

Besides, FIG. 8 shows a schematic flow chart of a function key with respect to this function. Referring to FIG. 8, the process initially proceeds to step 50 to judge whether or not the state given is immediately after entering a command (function). If the state is judged that it is not immediately after entering the function, the process proceeds to step 51 to execute each function calculation and to complete the process.

On the other hand, if the state is judged that it is immediately after entering the function, the process proceeds to step 52 to judge whether or not the content of FB designated by FBC is the i code. If the content of FB is not the i code, the process proceeds to step 51 to execute the same process mentioned above.

On the other hand, if the content of FB is the i code, the process proceeds to step 53 to execute the i code treatment for entering a value 0 to the real number portion of the complex number calculation register while entering a value 1 to the imaginary number portion.

Upon completing the treatment of the i code, a value 1 is subtracted from the FBC and the i code is deleted from the FB. The process proceeds to step 51 to complete the operation by executing the same treatment as mentioned above.

Therefore, the electronic apparatus according to the present invention allows entering complex numbers i's both before and after figures. For example, the apparatus allows entering both mathematical expressions i2 and 2i in the order as shown, which remarkably facilitates an input operation.

What is claimed is:

1. An electronic apparatus provided with a device of calculating complex numbers comprising:
   input means for entering calculation data including a value and an imaginary number unit i;
   output means for outputting a result of performed calculation of the complex numbers consisting of a real number and an imaginary number unit i;
   judging means for judging whether or not a value is entered immediately before or after the imaginary number unit i;
   first calculating means for calculating the complex numbers in accordance with a predetermined priority in calculation by substituting 1i with the imaginary number unit i while inserting a multiplication code between the entered value and the imaginary number unit i upon detecting the entered value is positioned before the entered imaginary number unit i; and
   second calculating means for calculating a portion having the imaginary number unit i as a function followed by an arguement upon detecting calculation data that a value is entered immediately after the imaginary number unit i.

2. An electronic apparatus of claim 1 further comprising:
   a function buffer enabling the storage of calculation commands up to the 16 steps; and
   writing in means for writing in calculation commands in the input order out of calculation data entered from the input means to the function buffer;
   wherein the multiplication code is inserted with the first calculation means within the function buffer.

3. An electronic apparatus of claim 2 further comprising:
   determining means for determining the priority of calculation order by comparing calculation commands written in the function buffer;
   calculation performing means for performing a calculation command previously memorized therein upon detecting through the comparison thereof with the determining means that the previously memorized command has a higher calculation priority; and
   shift means for shifting a calculation command memorized after deleting a calculation command executed with the calculating performing means in a position where the previously performed calculation command was disposed.

4. An electronic apparatus of claim 1 further comprising:

first storing means for storing an entered value in the real number portion of the calculation register upon detecting with the determining means that the value is entered immediately before an imaginary number unit i while storing a value 0 in the imaginary number portion of the calculation register; and second storing means for storing a value 0 in the real number portion of the calculation register upon detecting with the determining means that a value is entered immediately after the imaginary number unit i while storing a value 1 in the imaginary number unit i.

* * * * *